United States Patent
Black et al.

(10) Patent No.: US 7,571,480 B2
(45) Date of Patent: *Aug. 4, 2009

(54) PRESENTATION OF CORRELATED EVENTS AS SITUATION CLASSES

(75) Inventors: Steven Black, Round Rock, TX (US); Herve Debar, Caen (FR); John Michael Garrison, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 11/743,728

(22) Filed: May 3, 2007

(65) Prior Publication Data

US 2007/0204343 A1    Aug. 30, 2007

Related U.S. Application Data

(63) Continuation of application No. 09/931,301, filed on Aug. 16, 2001, now Pat. No. 7,278,160.

(51) Int. Cl.
*G06F 7/04* (2006.01)
*G06F 15/173* (2006.01)
*H04L 9/00* (2006.01)

(52) U.S. Cl. ............... 726/23; 726/27; 726/28; 726/29; 726/30; 713/151; 713/152; 713/153; 713/154; 709/223; 709/224; 709/225; 709/226; 709/227

(58) Field of Classification Search .............. 726/23
See application file for complete search history.

(56) References Cited

U.S. PATENT DOCUMENTS

| 3,617,640 A | 11/1971 | Cichanowicz |
| 5,239,459 A | 8/1993 | Hunt et al. |
| 5,568,471 A | 10/1996 | Hershey et al. |
| 5,621,889 A | 4/1997 | Lermuzeaux et al. |
| 5,991,881 A | 11/1999 | Conklin et al. |
| 6,163,257 A | 12/2000 | Tracy |
| 6,347,374 B1 * | 2/2002 | Drake et al. ............ 726/1 |
| 6,353,385 B1 | 3/2002 | Molini et al. |
| 2002/0073338 A1 * | 6/2002 | Burrows et al. ............ 713/201 |

(Continued)

FOREIGN PATENT DOCUMENTS

EP    0985995 A1    3/2000

(Continued)

OTHER PUBLICATIONS

"Dynamic Intrusion Detection for Secure Access Enclosure", IBM Technical Disclosure Bulletin, vol. 36, No. 06B, Jun. 1993, pp. 233-235.

(Continued)

*Primary Examiner*—Longbit Chai
(74) *Attorney, Agent, or Firm*—Yee & Associates, P.C.; Jeffrey S. LaBaw (57) ABSTRACT

A method, computer program product, and apparatus for presenting data about security-related events that puts the data into a concise form is disclosed. Events are abstracted into a set data-type. Sets with common elements are grouped together, and summaries of the groups—"situations"—are presented to a user or administrator.

21 Claims, 5 Drawing Sheets

U.S. PATENT DOCUMENTS

2002/0078381 A1    6/2002    Farley et al.

FOREIGN PATENT DOCUMENTS

| JP | 11212831 A | 8/1999 |
|---|---|---|
| WO | 9407339 A1 | 3/1994 |
| WO | 9959321 A1 | 11/1999 |

OTHER PUBLICATIONS

Ning et al., "Modeling Requests Among Cooperating Intrusion Detection Systems", Computer Communications, vol. 23, No. 17, pp. 1702-1715, Nov. 2000, Abstract.

Perrochon et al., "Enlisting Event Patterns for Cyber Battlefield Awareness", Proceedings DARPA Information Surviability Conference and Exposition, DISCEX'00, Pt. vol. 2, pp. 411-422, vol. 2, Published Las Alamitos CA, 1999, 2 vol. (xvi+423+425), Abstract.

Bowen et al., "Building survivable Systems: An Integrated Approach Based on Intrusion Detection and Damage Containment", Proceedings DARPA Information Survivability Conference and Exposition, DISCEX'00 Pt. vol. 2, pp. 84-99 Published Las Alamitos CA 1999 2 vol. (xvi+423+425), Abstract.

Ming et al., "A Large Scale Distributed Intrusion Detection Framework Based on Attack Strategy Analysis", Computer Networks, vol. 31, No. 23-24, pp. 24655-24675, Dec. 14, 1999, Abstract.

Kato et al., "A Real Time Intrusion Detection System (IDS) for Large Scale Networks and its Evaluations", IEICE Transactions on Communications, vol. E82-B, No. 11, pp. 1817-1825, Nov. 1999, Abstract.

Sekar et al., "On Preventing Intrusions by Process Behaviour Monitoring", Proceedings of the Workshop on Intrusion Detection and network Monitoring (ID'99), pp. 29-40, Published: Berkley CA 1999, 140 pp., Abstract.

Girardin "An Eye on Network Intruder-Administrator Shootouts", Proceedings of the Workshop on Intrusion Detection and network Monitoring (ID'99) pp. 19-28, Published Berkley CA 1999, 140 pp., Abstract.

Vigna et al., "NetSTAT: A Network-Based Intrusion Detection System", Journal of Computer Security, vol. 7 No. 1, pp. 37-71, 1999, Abstract.

Endler, "Intrusion Detection. Applying Machine Learning to Solaris Audit Data", Proceedings 14th Annual Computer Security Applications Conference (Cat. No. 98EX217) pp. 268-279, Published Los Alamitos, CA, 1998, xiii+365 pp., Abstract.

Bodek et al., "The Data Mining and Analysis of Packet Data for Detecting Network Intrusions: Preliminary Results", PADD97 Proceedings of the First international Conference on teh Practical Application of Knowledge Discovery and Data Mining, pp. 91-95, Published: Blackpool, UK 1997, 301 pp., Abstract.

White et al., "A Peer-Based Hardware Protocol for Intrusion Detection Sywstems", MILCOM 96, Conference Proceedings (Cat No. 96CH36008) Pt. vol. 2, pp. 468-472 vol. 2, Published: New York, NY 1996, 3 vol. xxiv+1083pp., abstract.

Winkler, Jr. "A UNIX Prototype for Intrusion and Anomaly Detection in Secure Networks", 13th National computer security Conference. Proceedings,Information systems Security Stnadards—The Key to the Future, pp. 115-124, vol. 1, Published: Gaithersburg, MD 1990, 2 vol. Xi+839 pp., Abstract.

Winkler, Jr. et al., "Intrusion and Anomaly Detection in Trusted Systems", Fifth Annual Computer Security Applications Conference (Cat. No. 89TH0287-3), pp. 39-45, Published Los Alamitos, CA 1990, xv+357 pp., Abstract.

Vigna et al., "NetSTAT: a Network Based Intrusion Detection Approach", Proceedings 14th Annual Computer Security Applications Conference (Cat. No. 98EX217) pp. 25-34, Published Los Alamitos, CA, 1998, xiii+365 pp., Abstract.

\* cited by examiner

Event = (source, target, signature)
         502     504    506
         500

Figure 6

Severity = 18

PRESENTATION OF CORRELATED EVENTS AS SITUATION CLASSES

This application is a continuation of application Ser. No. 09/931,301, filed Aug. 16, 2001, now U.S. Pat. No. 7,278,160, which is herein incorporated by reference.

BACKGROUND OF THE INVENTION

1. Technical Field

The present invention is directed toward presenting network security and intrusion information to a user. More specifically, the present invention provides a method, computer program product, and apparatus for concise display of information relating to a series of security violations.

2. Description of Related Art

Much of the progress in computer technology in recent years has centered around inter-computer communication. Networks of small-scale computers have all but replaced the bulky mainframe computers of the past. It is less expensive and more efficient for users to share data among single-user workstations and small-scale servers than it is to share computing time on a single mainframe computer.

Increases in connectivity between computers, especially through the Internet, the world's largest and most interconnected computer network, are not without costs. Increased connectivity brings with it an increased likelihood of a security breach or other malevolent activity. Put another way, the more accessible computers become, the more they will be accessed.

It is thus imperative for organizations that rely on networks of computers to have effective security violation detection systems in place to prevent and remedy security compromises. In particular, where many system events that might be categorized as suspicious take place, it is important to be able to sort through a large amount of event data to determine what is actually taking place. When system events are simply "dumped" to a human administrator or user, it is difficult for the human administrator to sort through and make sense of the data.

A number of systems have been developed to address this need. Currently available systems apply pattern-matching techniques to identify automatically particular types of security breaches from system events.

Automated pattern-matching systems that "simulate" reasoning—however much they aid network administrators in interpreting the large volumes of event data produced within a network—are not without limitations. Pattern-matching algorithms are only as effective as they patterns they search for. They have little ability to adapt to situations not envisioned by their designers.

What is needed, then is a system for presenting information about security-related events in a system, that puts the information into a form that a human administrator can readily work with.

SUMMARY OF THE INVENTION

The present invention provides a method, computer program product, and apparatus for presenting data about security-related events that puts the data into a concise form. Events are abstracted into a set data-type identifying the source, target, and category of the event. Sets with common elements are grouped together, and those set-groups having a severity exceeding a threshold are designated "situations." The situations are then presented to a user or administrator.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
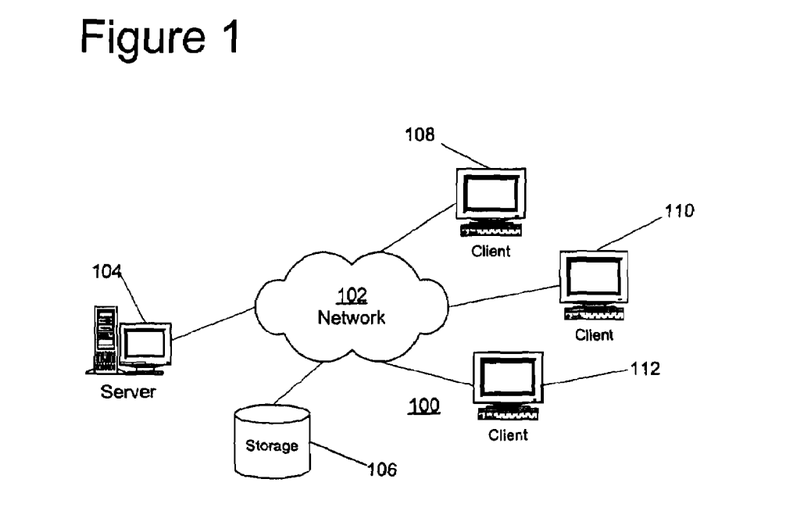
FIG. 1 is a diagram of a networked data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
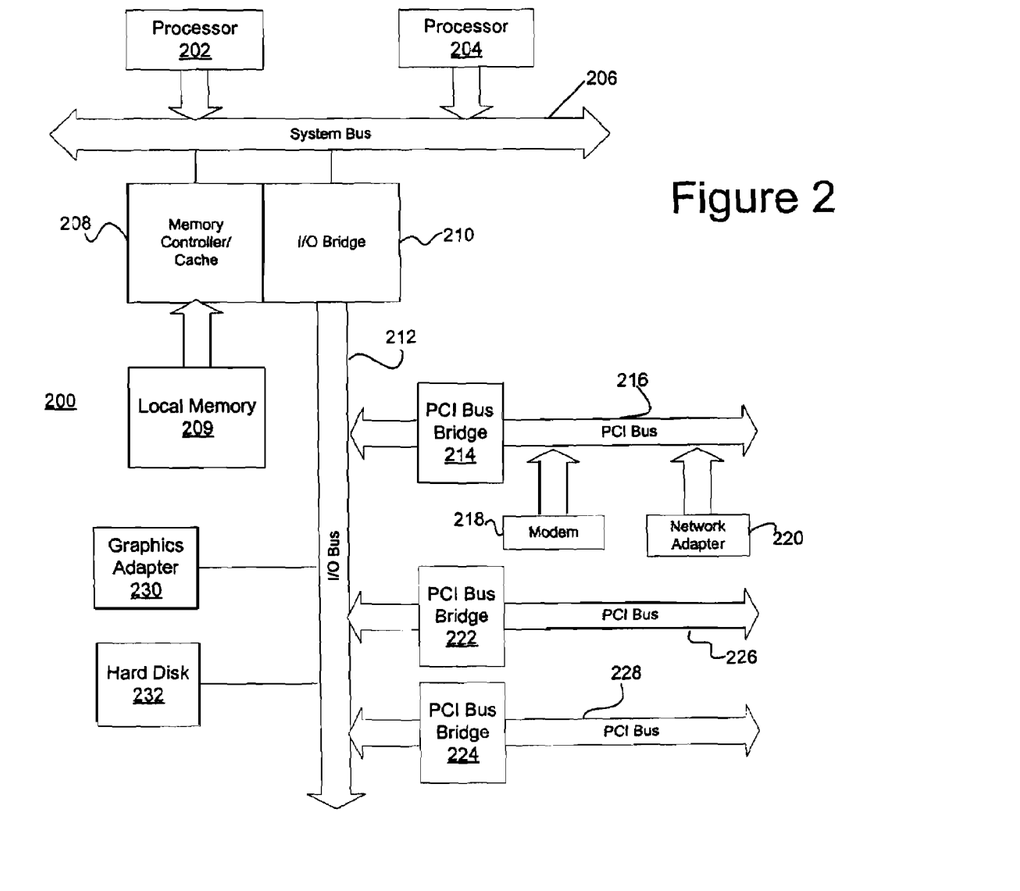
FIG. 2 is a block diagram of a server system within the networked data processing system of FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
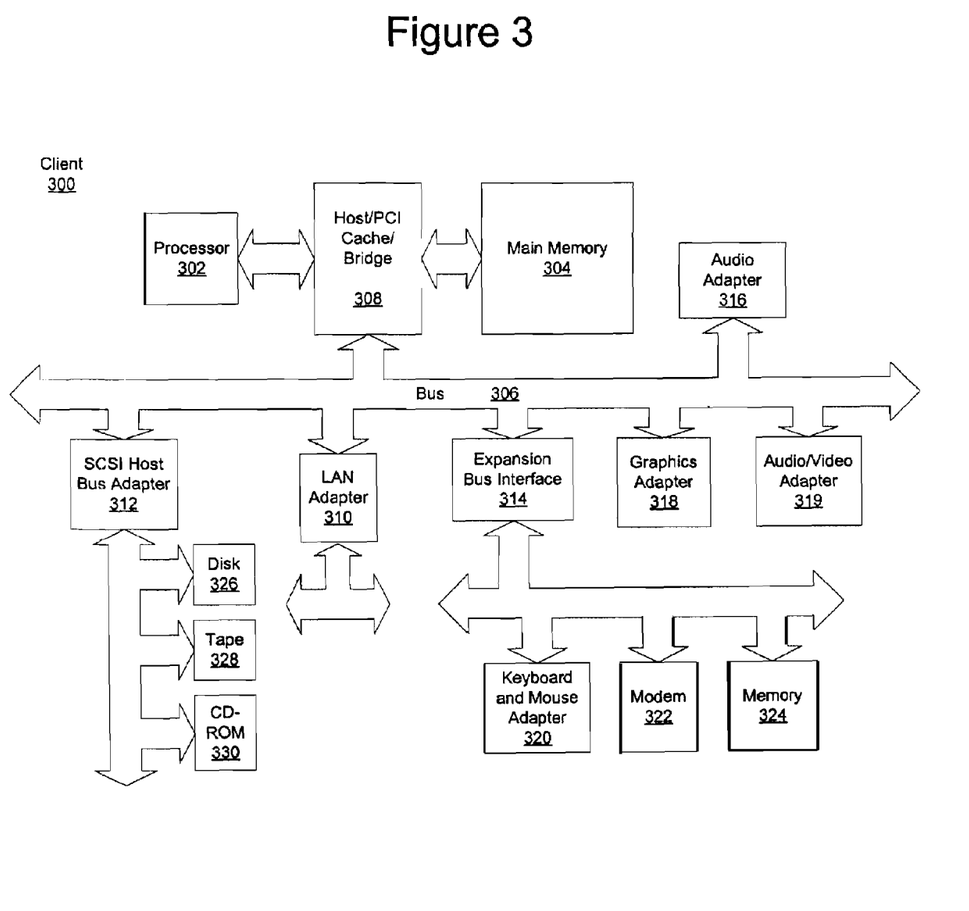
FIG. 3 is a block diagram of a client system within the networked data processing system of FIG. 1.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, computer program product, and apparatus for reporting possible security violations in a network data processing system containing several individual client or server computers. The techniques of the present invention allow information about potential security violations to be summarized and presented to a user in a concise and easy to understand format.

Figure 4A:
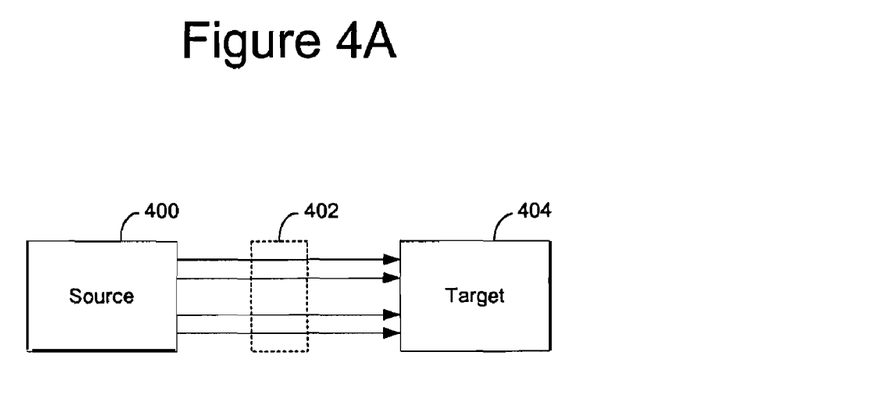
FIG. 4A is a diagram of security attacks within a preferred embodiment of the present invention.
Figure 4B:
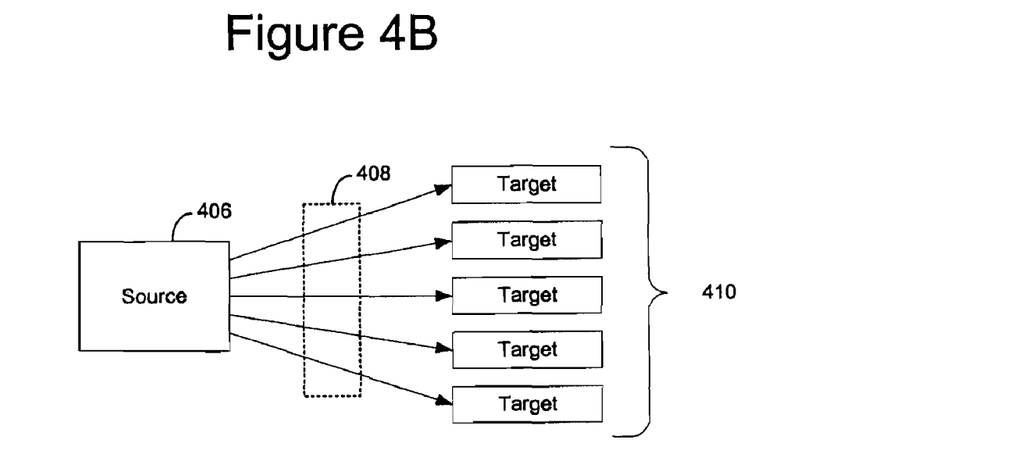
FIG. 4B is a diagram of security attacks within a preferred embodiment of the present invention.
Figure 4C:
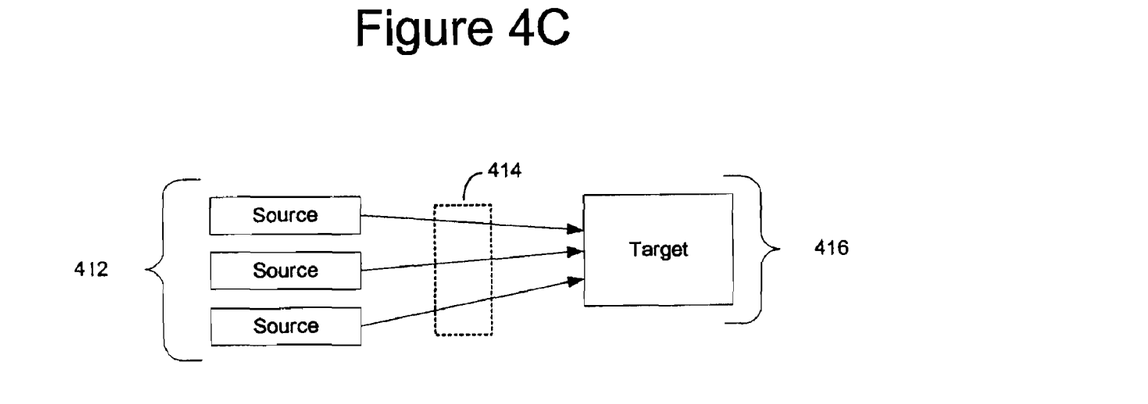
FIG. 4C is a diagram of security attacks within a preferred embodiment of the present invention.

FIGS. 4A-4C depict a number of different scenarios in which attacks (or suspicious activity) directed at a network can occur in a preferred embodiment of the present invention. FIG. 4A depicts the situation where a single source computer 400 directs a number of attacks 402 toward a single target computer 404. Attacks 402 may be of a single type, such as in the case of a "denial of service attack," in which target computer 404 would be flooded with electronic mail or other network information from source computer 400. Alternatively, the attacks may be of different types, such as an attempt to break into a user's account on target computer 404, coupled with the transmission of a "Trojan horse" program via electronic mail. (A "Trojan horse," much like the famous Trojan horse of classical antiquity, is a computer program that appears useful, but actually contains hidden code with a harmful effect.)

FIG. 4B depicts a situation in which a single source computer 406 directs attacks 408 at several computers 410 within the network. FIG. 4C depicts another situation in which several source computer 412 direct attacks 414 at a single target computer 416.

One easily understands what is happening within the network when attacks are summarized. That is, if one is told that "Computer A is attacking computers on the network," one knows immediately to do something about "Computer A." If, on the other hand, if one reads a list of all of the possibly suspicious activity in the network, one may experience information overload; one may not realize that a problem exists with "Computer A." This is particularly true when "Computer A" attacks multiple computers, as in FIG. 4B. The present invention provides a way to summarize reports of suspicious activity in such a way that an administrator operating a computer system within the network can easily identify and correct security problems.

Figure 5:
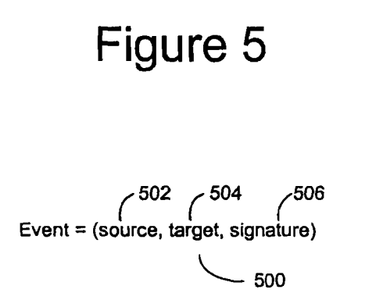
FIG. 5 is a representation of a security event within a preferred embodiment of the present invention.

FIG. 5 depicts a data representation 500 of a single suspicious event or attack (security attacks being a subclass of event) in accordance with a preferred embodiment of the present invention. When an event occurs, an instance of data representation 500 is generated to record the event. An event can be represented as a triplet (or possibly a grouping of higher cardinality) containing the elements depicted, source computer 502, target computer 504, and event category 506. Source computer 502 and target computer 504 are relatively straightforward in that they represent the source computer from which the event emanates and the target computer of the event. Event category 506 represents the general type of event that has occurred. Possible event categories include, but are not limited to, web server event, e-mail event, Trojan horse, denial of service, virus, network event, authentication failures, and access violations.

Figure 6:
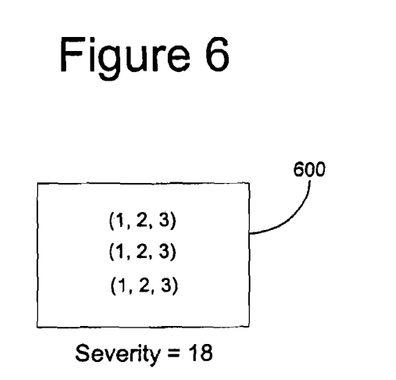
FIG. 6 is a diagram of a group of security events in a preferred embodiment of the present invention.

FIG. 6 is a diagram depicting how multiple identical events may be conceptualized together in a group 600 in a preferred embodiment of the present invention. A group is an aggregation of events in which all of the events have at least one common element.

Any given group has a particular severity level associated with it. The severity level of a given group is a function of 1.) the number of events comprising the group, and 2.) the values of the common elements in the group. For instance, a group representing a large number of very serious attacks (those that attack critical targets or attack in a severe way) will have a high severity level, and a group representing a small number of relatively minor attacks will have a low severity level. Any appropriate formula or function for calculating the severity level of a group may be used.

A situation is a group in which the severity level exceeds a certain pre-determined threshold. The pre-determined threshold may vary depending on how many and which of the three elements all of the events in a situation have in common and based on how serious the particular security events involved are. The threshold for each group may be set by formula or by assigning a fixed number to each group type (e.g., all (1, *, 3) groups have threshold 25). The important thing is for each group type to have an associated threshold.

In this case, group 600 represents that a number of events with source "1," target "2," and event category "3" have occurred. (In this and the examples that follow, numbers are used to represent the values within the event triplets. In an actual implementation, any form of representation could be used; numbers are used here for simplicity.) In the example, the severity level of group 600 is 21 (i.e. 7 points for each event in the group-note again, however, that any formula for calculating a severity level that is reasonably related to the qualitative severity of the events making up the group may be used). If the threshold for this type of group (i.e., one holding (1, 2, 3) events) is set at 18, then group 600 is designated a situation, since group 600's severity level of 21 exceeds the threshold 18.

In short, as the terms are used in this document, a group is a collection of similar or identical events. A situation is a group wherein the severity level exceeds a certain predetermined threshold. Situations are reported to an administrator or user as summaries of security attacks.

Figure 7:
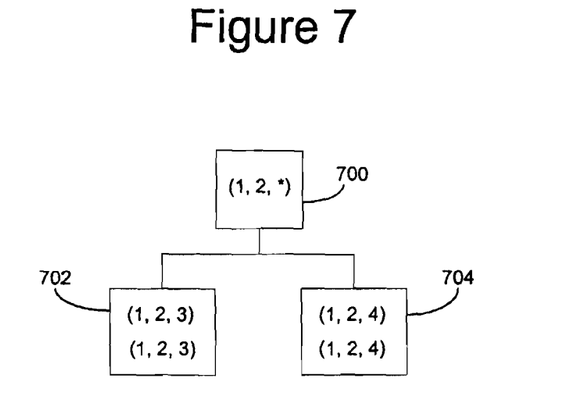
FIG. 7 is a diagram of groups and situations within a preferred embodiment of the present invention.

FIG. 7 shows how a situation with a broader scope can be composed from multiple similar-events in a preferred embodiment of the present invention. Situation 700 summarizes several events that all have source "1" and target "2." These events include a group of events with event category "3" 702 and a group of events with event category "4" 704. In response to deriving situation 700 from its underlying events, a user or administrator can be notified simply that "Computer 1 is directing security attacks against Computer 2," through a text message, graphical alert, audio message, or the like.

Figure 8:
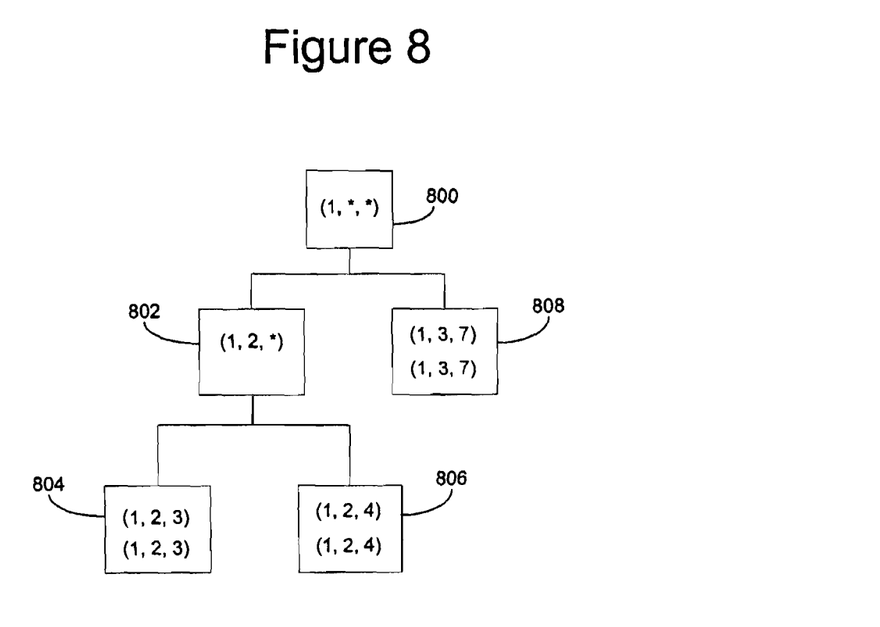
FIG. 8 is a diagram of groups and situations within a preferred embodiment of the present invention.

FIG. 8 shows how, in a preferred embodiment of the present invention, a situation 800 with an even broader scope can be generated. Situation 800 represents that source computer "1" is directing various attacks at computers within the network. Situation 800 is generalized from the events underlying situation 802, which is generalized from event groups 804 and 806. In addition, situation 800 also includes events from event group 808, which represents a different target computer that situation 802 and its underlying groups.

TABLE I

Which elements are held in common in each class

| Class | Source | Target | Category |
|---|---|---|---|
| Situation 1 | X | X | X |
| Situation 2-1 | X | X | |
| Situation 2-2 | | X | X |
| Situation 2-3 | X | | X |
| Situation 3-1 | X | | |
| Situation 3-2 | | X | |
| Situation 3-3 | | | X |

Table I is a listing of situation classes in a preferred embodiment of the present invention. Each of these situation classes is defined by which elements of the situation sets are held in common in each of the situations. Situation classes provide a means of categorizing situations according to how many elements are held in common across the events making up the situation. For instance, Table I shows that a Situation 2-3 holds events having common source and event categories. A situation 2-3, for example, could contain events (1, 2, 3), (1, 3, 3), (1, 1, 3), (1, 4, 3), etc., since in each one of these events, the source (1) and category (3) are the same.

Situation classes are significant in that they both describe a pattern of attack (e.g., many machines targeting a single machine, or a single machine targeting many machines with the same type of attack, etc.) and a degree of seriousness of the attacks. A Situation 1, for instance, is made up of identical events. For a Situation 1 to even exist, however, a serious level of identical security attacks must exist at a single target, all with the same attack source. This "serious level" of attack may be serious because of the particular type, source or target of the attacks, or it may be serious because of a large number of attack events. Nonetheless, the level of attack at the single target will be very high.

Contrast Situation 1 with Situation 3-3. In Situation 3-3, only the event category is held in common. Thus, attacks may be spread out across many targets. Therefore, the attacks at each target may be on a small scale, but the aggregate number of attacks is large, when all machines in the network are considered.

Figure 9:
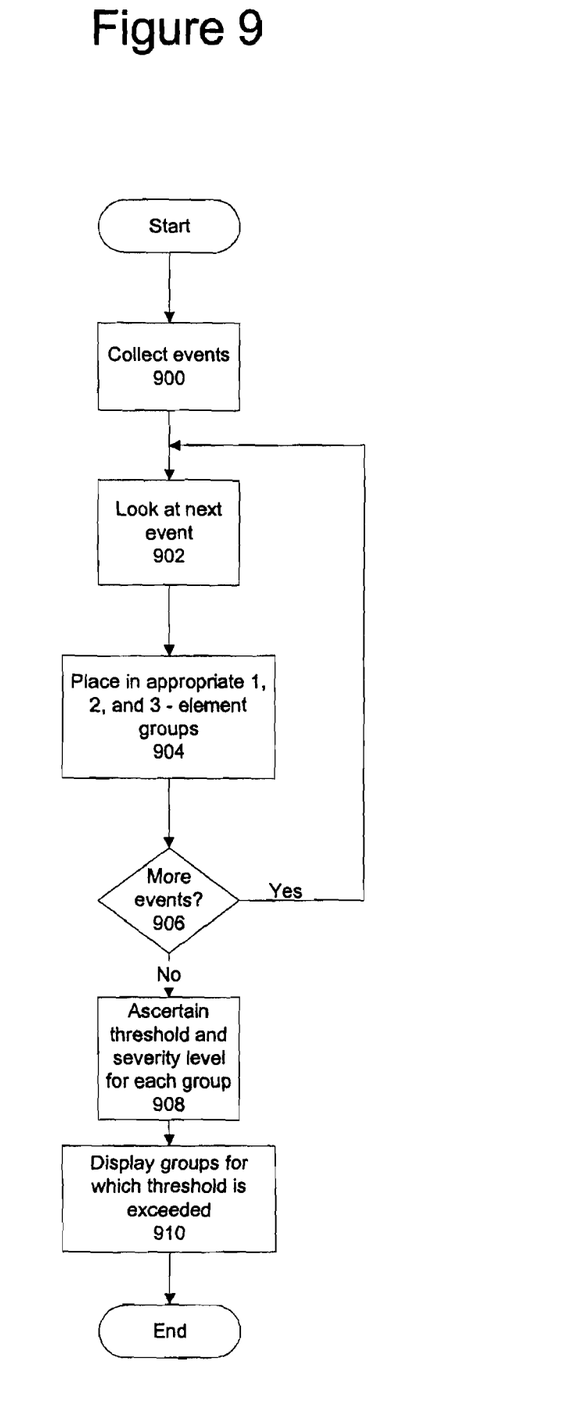
FIG. 9 is a flowchart representation of a process of generalizing security-related events into situations, in accordance with a preferred embodiment of the present invention.

FIG. 9 is a flowchart representation of a process of generalizing events to derive situations, in accordance with a preferred embodiment of the present invention. First a list of events that occurred during a given time period is collected (step 900). The next event in the list is then considered (step 902). The event is then placed in all groups in which the event may be classified (e.g., if the event is (1, 2, 3), it may be placed in groups (1, 2, *), (1, *, 3), (*, 2, 3), (1, *, *), (*, 2, *), (*, *, 3), and (1, 2, 3)) (step 904). If there are more events in the list (step 906), the process cycles to step 902 to process the additional events. If not, then the thresholds and severity levels for each of the groups is ascertained (e.g., calculated or looked up) (step 908). Finally, groups that exceed their respective pre-determined thresholds are displayed as situations to a user or administrator (step 910).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for reporting security situations, comprising the steps of:
    logging events by storing event attributes in memory as an event set, wherein each event set includes a source computing device attribute, a target computing device attribute and an event category attribute;
    classifying, by a processor, events as groups by aggregating events with at least one attribute within the event set as an identical value, wherein each event is classified into a plurality of groups, wherein an event in a group has a predefined number of attributes with values identical to other events in the group, wherein the attributes having identical values of one group are different from the attributes having identical values of another group, and wherein the identical value of at least one attribute of one group differs from the identical value of a corresponding attribute of another group;
    calculating, by a processor, severity levels for the groups, wherein a severity level for a group is a function of a number of events comprising the group and values of common elements in the group; and
    reporting a group from the groups to a user as a situation, if a severity level of the group exceeds a threshold value.

2. The method of claim 1, wherein the severity levels are calculated based on at least one of the number of event sets within each of the groups, the source computing device attribute of the event sets within each of the groups, the target computing device attribute of the event sets within each of the groups, and the event category attribute of the event sets within each of the groups.

3. The method of claim 1, wherein the events include at least one of a web server event, an electronic mail event, a Trojan horse, denial of service, a virus, a network event, an authentication failure, and an access violation.

4. The method of claim 1, further comprising:
    calculating the threshold value based on at least one of the source computing device attribute of the event sets within the group, the target computing device attribute of the event sets within the group, the event category attribute in each event set of the group, and the number of attributes in each event set of the group that are held constant across all of the event sets in the group.

5. The method of claim 1, wherein the target computing device attribute represents one of a computer or a collection of computers.

6. The method of claim 1, wherein the source computing device attribute represents one of a computer or a collection of computers.

7. The method of claim 1, further comprising:
    aggregating a subset of the groups into a combined group.

8. A computer program product in a computer readable storage medium for reporting security events, comprising instructions for:
    logging events by storing event attributes as an event set, wherein each event set includes a source computing device attribute, a target computing device attribute and an event category attribute;
    classifying events as groups by aggregating events with at least one attribute within the event set as an identical value, wherein each event is classified into a plurality of groups, wherein an event in a group has a predefined number of attributes with values identical to other events in the group, wherein the attributes having identical values of one group are different from the attributes having identical values of another group, and wherein the identical value of at least one attribute of one group differs from the identical value of a corresponding attribute of another group;
    calculating severity levels for the groups, wherein a severity level for a group is a function of a number of events comprising the group and values of common elements in the group; and
    reporting a group from the groups to a user as a situation, if a severity level of the group exceeds a threshold value.

9. The computer program product of claim 8, wherein the severity levels are calculated based on at least one of the number of event sets within each of the groups, the source computing device attribute of the event sets within each of the groups, the target computing device attribute of the event sets within each of the groups, and the event category attribute of the event sets within each of the groups.

10. The computer program product of claim 8, wherein the events include at least one of a web server event, an electronic mail event, a Trojan horse, denial of service, a virus, a network event, an authentication failure, and an access violation.

11. The computer program product of claim 8, comprising additional instructions for:

calculating the threshold value based on at least one of the source computing device attribute of the event sets within the group, the target computing device attribute of the event sets within the group, the event category attribute in each event set of the group, and the number of attributes in each event set of the group that are held constant across all of the event sets in the group.

12. The computer program product of claim 8, wherein the target computing device attribute represents one of a computer or a collection of computers.

13. The computer program product of claim 8, wherein the source computing device attribute represents one of a computer or a collection of computers.

14. The computer program product of claim 8, comprising additional instructions for:
aggregating a subset of the groups into a combined group.

15. A data processing system for reporting security events, comprising:
a bus system;
a memory;
a processing unit, wherein the processing unit includes at least one processor; and
a set of instructions within the memory, wherein the processing unit executes the set of instructions to perform the acts of:
logging events by storing event attributes as an event set, wherein each event set includes a source computing device attribute, a target computing device attribute and an event category attribute;
classifying events as groups by aggregating events with at least one attribute within the event set as an identical value, wherein each event is classified into a plurality of groups, wherein an event in a group has a predefined number of attributes with values identical to other events in the group, wherein the attributes having identical values of one group are different from the attributes having identical values of another group, and wherein the identical value of at least one attribute of one group differs from the identical value of a corresponding attribute of another group;
calculating severity levels for the groups, wherein a severity level for a group is a function of a number of events comprising the group and values of common elements in the group; and
reporting a group from the groups to a user as a situation, if a severity level of the group exceeds a threshold value.

16. The data processing system of claim 15, wherein the severity levels are calculated based on at least one of the number of event sets within each of the groups, the source computing device attribute of the event sets within each of the groups, the target computing device attribute of the event sets within each of the groups, and the event category attribute of the event sets within each of the groups.

17. The data processing system of claim 15, wherein the events include at least one of a web server event, an electronic mail event, a Trojan horse, denial of service, a virus, a network event, an authentication failure, and an access violation.

18. The data processing system of claim 15, wherein the processing unit executes the set of instructions to perform the act of:
calculating the threshold value based on at least one of the source computing device attribute of the event sets within the group, the target computing device attribute of the event sets within the group, the event category attribute in each event set of the group, and the number of attributes in each event set of the group that are held constant across all of the event sets in the group.

19. The data processing system of claim 15, wherein the target computing device attribute represents one of a computer or a collection of computers.

20. The data processing system of claim 15, wherein the source computing device attribute represents one of a computer or a collection of computers.

21. The data processing system of claim 15, wherein the processing unit executes the set of instructions to perform the act of:
aggregating a subset of the groups into a combined group.

* * * * *